US010662783B2

(12) United States Patent
Spangler

(10) Patent No.: US 10,662,783 B2
(45) Date of Patent: May 26, 2020

(54) VARIABLE HEAT TRANSFER COLLECTOR BAFFLE

(71) Applicant: United Technologies Corporation, Farmington, CT (US)

(72) Inventor: Brandon W. Spangler, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 16/116,351

(22) Filed: Aug. 29, 2018

(65) Prior Publication Data

US 2020/0072060 A1 Mar. 5, 2020

(51) Int. Cl.
*F01D 5/18* (2006.01)
*F01D 9/04* (2006.01)

(52) U.S. Cl.
CPC ........ *F01D 5/189* (2013.01); *F05D 2260/201* (2013.01); *F05D 2260/221* (2013.01); *F05D 2300/6033* (2013.01)

(58) Field of Classification Search
CPC .......... F01D 5/186; F01D 5/187; F01D 5/189; F01D 9/041; F01D 9/065; F05D 2220/32; F05D 2240/126; F05D 2240/30; F05D 2240/304; F05D 2260/232; F05D 2260/22141; Y02T 50/673; Y02T 50/676
See application file for complete search history.

(56) References Cited

U.S. PATENT DOCUMENTS

| 2,920,866 | A |   | 1/1960  | Spurner |                      |
|-----------|---|---|---------|---------|----------------------|
| 5,120,192 | A | * | 6/1992  | Ohtomo  | F01D 5/189 415/115   |
| 5,259,730 | A | * | 11/1993 | Damlis  | B23P 15/04 416/96 A  |
| 5,762,471 | A | * | 6/1998  | Cunha   | F01D 5/189 415/115   |
| 6,036,436 | A | * | 3/2000  | Fukuno  | F01D 5/187 415/115   |

(Continued)

FOREIGN PATENT DOCUMENTS

| BE | 685320 A    | 1/1967 |
| BE | 10004128 A1 | 8/2001 |

(Continued)

OTHER PUBLICATIONS

Extended European Search Report for EP Application No. 19191314.4, dated Feb. 3, 2020, 8 pages.

*Primary Examiner* — Igor Kershteyn
(74) *Attorney, Agent, or Firm* — Kinney & Lange, P.A.

(57) ABSTRACT

A gas turbine engine component includes an airfoil defined by a leading edge, a trailing edge, a pressure sidewall, and a suction sidewall. An internal cavity extends radially through the airfoil and is partially defined by an inner surface of the pressure sidewall and an inner surface of the suction sidewall. A baffle is disposed within the internal cavity, and includes a baffle wall conformal with adjacent surfaces of the internal cavity, a divider separating a forward chamber and an aft chamber, and a plurality of orifices extending through the baffle wall at the forward chamber. At least one axial rib is disposed between the baffle wall and the internal cavity, and is positioned at a discrete spanwise location of the airfoil.

19 Claims, 5 Drawing Sheets

(56) References Cited

U.S. PATENT DOCUMENTS

| | | | | |
|---|---|---|---|---|
| 6,099,244 | A * | 8/2000 | Tomita | F01D 5/18 |
| | | | | 415/115 |
| 6,200,087 | B1 * | 3/2001 | Tung | F01D 5/186 |
| | | | | 415/115 |
| 6,428,273 | B1 * | 8/2002 | Keith | F01D 5/189 |
| | | | | 416/97 R |
| 6,884,036 | B2 * | 4/2005 | Shi | F01D 5/187 |
| | | | | 415/115 |
| 7,527,474 | B1 | 5/2009 | Liang | |
| 8,142,153 | B1 * | 3/2012 | Liang | F01D 9/04 |
| | | | | 416/1 |
| 8,348,613 | B2 | 1/2013 | Gregg et al. | |
| 9,115,590 | B2 | 8/2015 | Spangler et al. | |
| 9,777,581 | B2 | 10/2017 | Nilsson | |
| 9,988,913 | B2 | 6/2018 | Spangler | |
| 10,012,406 | B2 | 7/2018 | Spangler et al. | |
| 2003/0068222 | A1 * | 4/2003 | Cunha | F01D 5/18 |
| | | | | 415/115 |
| 2017/0058679 | A1 * | 3/2017 | Spangler | F01D 9/041 |

FOREIGN PATENT DOCUMENTS

| | | |
|---|---|---|
| EP | 3124747 A1 | 2/2017 |
| FR | 2149105 A5 | 3/1973 |

* cited by examiner

VARIABLE HEAT TRANSFER COLLECTOR BAFFLE

BACKGROUND

Turbine airfoils experience high external heat load at the stagnation point of the leading edge, and that heat load decreases in the direction of the trailing edge. Ceramic matrix composite (CMC) airfoils have lower stress capability than many metallic airfoils, and thermal gradients must therefore be minimized. One CMC airfoil cooling scheme can include flowing cooling air radially through a leading edge cavity of the airfoil to create high heat transfer at the stagnation point. However, such a cooling scheme can result in flow distributing to other areas of the cavity to balance heat transfer, which can lead to the over-cooling of regions away from the stagnation point.

SUMMARY

A gas turbine engine component includes an airfoil defined by a leading edge, a trailing edge, a pressure sidewall, and a suction sidewall. An internal cavity extends radially through the airfoil and is partially defined by an inner surface of the pressure sidewall and an inner surface of the suction sidewall. A baffle is disposed within the internal cavity, and includes a baffle wall conformal with adjacent surfaces of the internal cavity, a divider separating a forward chamber and an aft chamber, and a plurality of orifices extending through the baffle wall at the forward chamber. At least one axial rib is disposed between the baffle wall and the internal cavity, and is positioned at a discrete spanwise location of the airfoil.

A method of cooling a gas turbine engine component includes radially feeding, at a cooling inlet, a cooling fluid to a forward chamber of a baffle disposed within an internal cavity of the component, and axially passing a portion of the cooling fluid through an orifice within a baffle wall at the forward chamber. The method further includes axially passing the portion of the cooling fluid between the baffle wall and the internal cavity, and providing the portion of the cooling fluid to an aft chamber of the baffle.

DETAILED DESCRIPTION

The present invention is directed to a gas turbine engine component and associated cooling scheme. The component includes a radially extending cavity with a baffle. The baffle includes a forward chamber with impingement holes through which cooling fluid fed into the baffle can pass into the region between the baffle and internal cavity. Fluid exiting the baffle is directed axially aft using axial ribs. The fluid is collected by an aft chamber of the baffle and flows radially through the aft chamber until it exits the component. Various thermal heat transfer features can be formed on the component along the cooling flow path to enhance component cooling.

Figure 1:
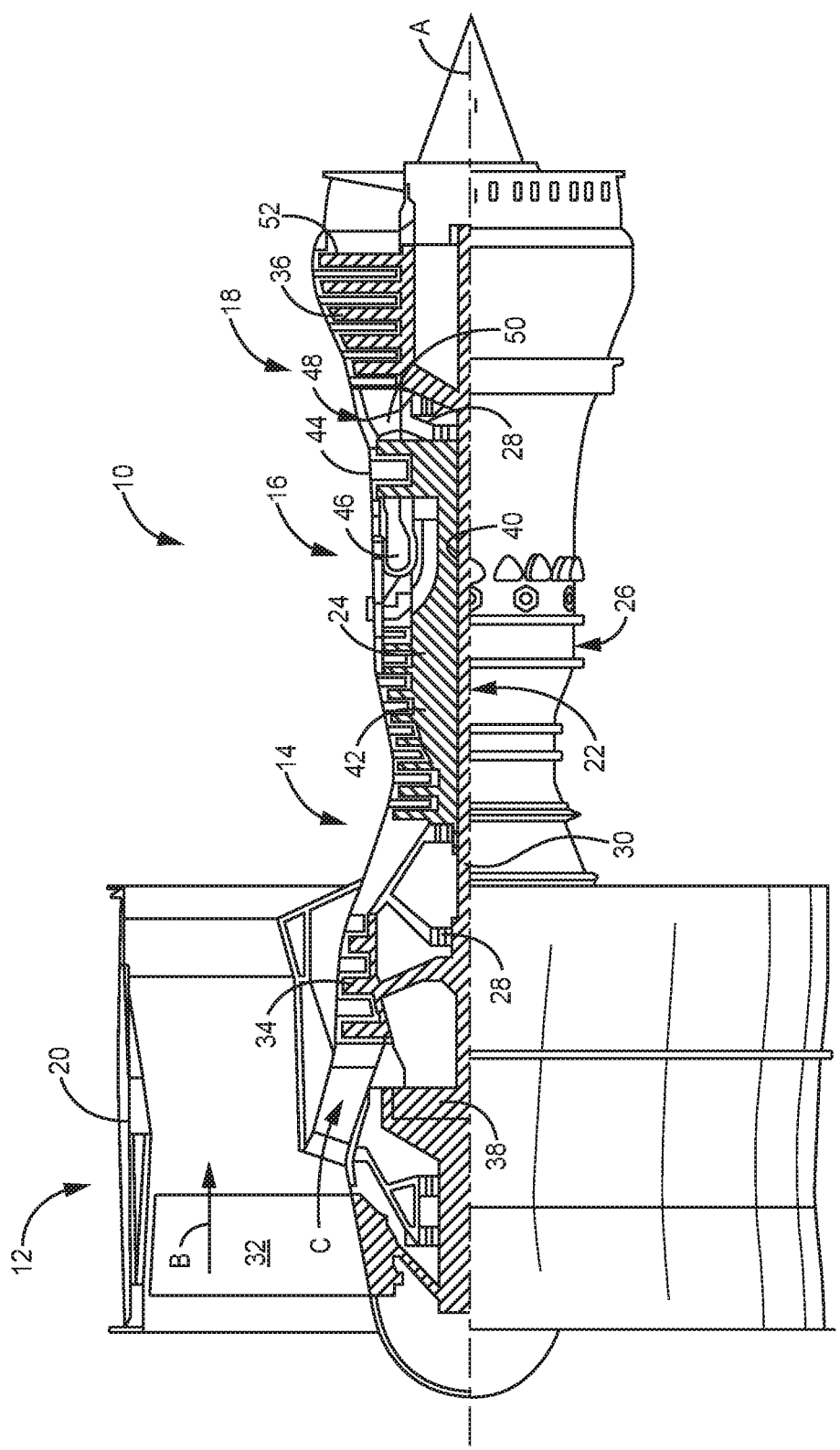
FIG. 1 is a schematic diagram depicting an exemplary embodiment of a gas turbine engine.

FIG. 1 schematically illustrates a gas turbine engine 10. The gas turbine engine 10 is disclosed herein as a two-spool turbofan that generally incorporates a fan section 12, a compressor section 14, a combustor section 16 and a turbine section 18. The fan section 12 drives air along a bypass flow path B in a bypass duct defined within a nacelle 20, while the compressor section 14 drives air along a core flow path C for compression and communication into the combustor section 16 then expansion through the turbine section 18. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 10 generally includes a low speed spool 22 and a high speed spool 24 mounted for rotation about an engine central longitudinal axis A relative to an engine static structure 26 via several bearing systems 28. It should be understood that various bearing systems 28 at various locations may alternatively or additionally be provided, and the location of bearing systems 28 may be varied as appropriate to the application.

The low speed spool 22 generally includes an inner shaft 30 that interconnects a fan 32, a first (or low) pressure compressor 34 and a first (or low) pressure turbine 36. The inner shaft 30 is connected to the fan 32 through a speed change mechanism, which in exemplary gas turbine engine 10 is illustrated as a geared architecture 38 to drive the fan 32 at a lower speed than the low speed spool 22. The high speed spool 24 includes an outer shaft 40 that interconnects a second (or high) pressure compressor 42 and a second (or high) pressure turbine 44. A combustor 46 is arranged in exemplary gas turbine 10 between the high pressure compressor 42 and the high pressure turbine 44. A mid-turbine frame 48 of the engine static structure 26 is arranged generally between the high pressure turbine 44 and the low pressure turbine 36. The mid-turbine frame 48 further supports bearing systems 28 in the turbine section 18. The inner shaft 30 and the outer shaft 40 are concentric and rotate via bearing systems 28 about the engine central longitudinal axis A which is collinear with their longitudinal axes.

The core airflow is compressed by the low pressure compressor 34 then the high pressure compressor 42, mixed and burned with fuel in the combustor 46, then expanded over the high pressure turbine 44 and low pressure turbine 36. The mid-turbine frame 48 includes airfoils 50 which are in the core airflow path C. The turbines 36, 44 rotationally drive the respective low speed spool 22 and high speed spool 24 in response to the expansion. It will be appreciated that each of the positions of the fan section 12, compressor section 14, combustor section 16, turbine section 18, and fan drive gear system 38 may be varied. For example, gear system 38 may be located aft of combustor section 16 or even aft of turbine section 18, and fan section 12 may be positioned forward or aft of the location of gear system 38.

The engine 10 in one example is a high-bypass geared aircraft engine. In a further example, the engine 10 bypass ratio is greater than about six (6), with an example embodiment being greater than about ten (10), the geared architecture 38 is an epicyclic gear train, such as a planetary gear system or other gear system, with a gear reduction ratio of greater than about 2.3 and the low pressure turbine 36 has a pressure ratio that is greater than about five. In one disclosed embodiment, the engine 10 bypass ratio is greater than about ten (10:1), the fan diameter is significantly larger than that of the low pressure compressor 34, and the low pressure turbine 36 has a pressure ratio that is greater than about five 5:1. Low pressure turbine 36 pressure ratio is pressure measured prior to inlet of low pressure turbine 36 as related to the pressure at the outlet of the low pressure turbine 36 prior to an exhaust nozzle. The geared architecture 38 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 12 of the engine 10 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

The example gas turbine engine includes fan 32 that comprises in one non-limiting embodiment less than about twenty-six (26) fan blades. In another non-limiting embodiment, fan section 12 includes less than about twenty (20) fan blades. Moreover, in one disclosed embodiment low pressure turbine 36 includes no more than about six (6) turbine rotors schematically indicated at 52. In another non-limiting example embodiment low pressure turbine 36 includes about three (3) turbine rotors. A ratio between number of fan blades 42 and the number of low pressure turbine rotors is between about 3.3 and about 8.6. The example low pressure turbine 36 provides the driving power to rotate fan section 12 and therefore the relationship between the number of turbine rotors 52 in low pressure turbine 36 and number of blades 32 in fan section 12 disclose an example gas turbine engine 10 with increased power transfer efficiency.

Figure 2:
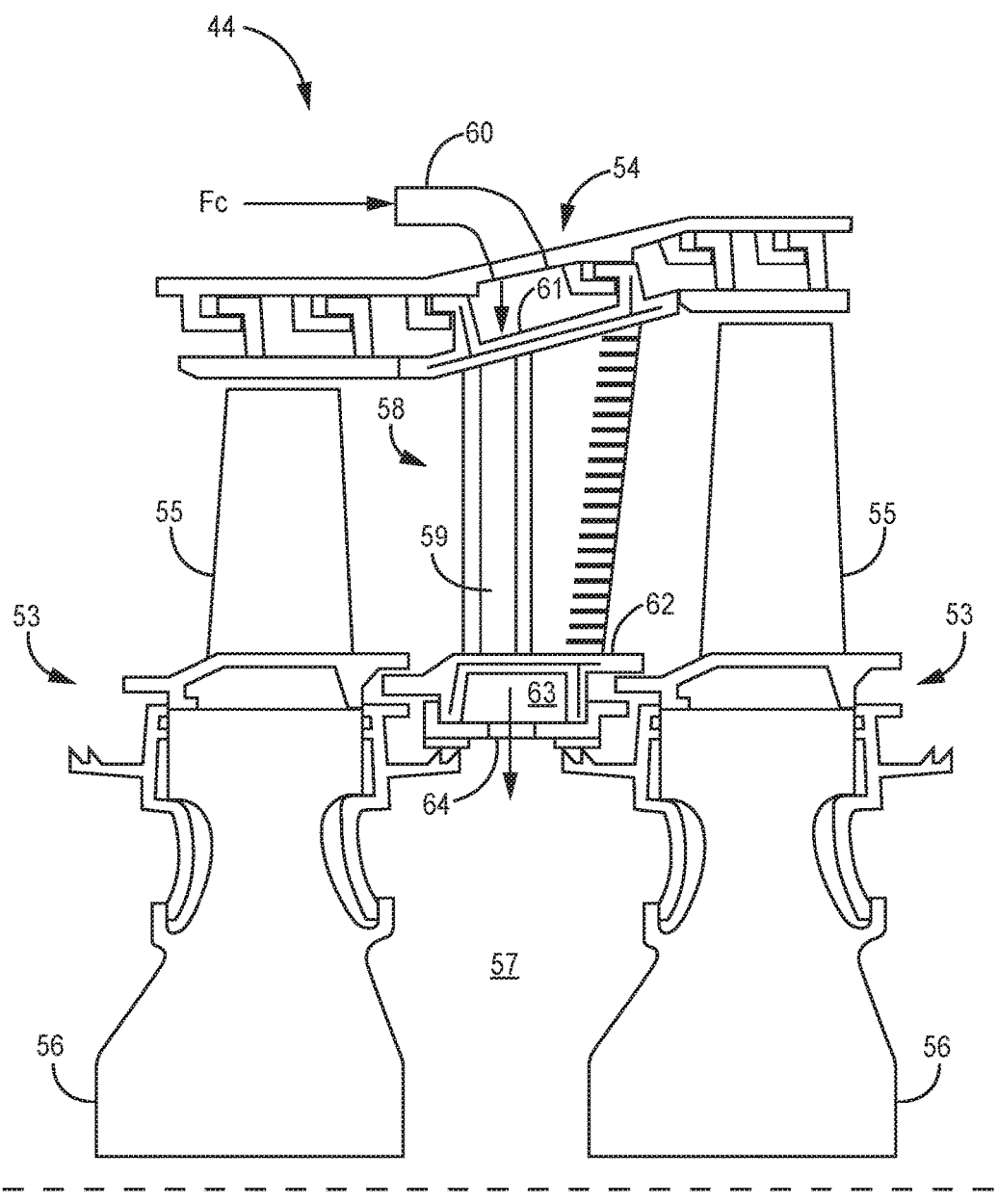
FIG. 2 is a cross-sectional view of a high pressure turbine section of the gas turbine engine in which a vane having the cooling scheme of the present invention is used.

FIG. 2 is a partial cross-section showing high pressure turbine section 44 which includes alternating rows of rotor assemblies 53 and vane assemblies 54 (only one of which is shown). Each rotor assembly 53 includes blades 55 attached to disks 56. A rotor cavity 57 exists between adjacent disks 56. Vane assembly 54, includes vanes 58, each of which can include a plenum/cavity 59 through which a cooling fluid $F_C$ (indicated with arrows) can pass. The cooling fluid can be provided from cooling source 60, which is illustrated in FIG. 2 as a turbine cooling air (TCA) pipe proximate radially outer platform 61 (with respect to rotational axis A of gas turbine engine 10) of vane assembly 54. Cooling fluid source 60 can alternatively be any source of cooling fluid, such as bleed air, sourced from a location upstream of vane assembly 54. As shown, the cooling fluid enters vane 58 at outer platform 61 and flows through cavity 59, exits at radially inner platform 62, enters vane cavity 63, then flows into rotor cavity 57 through opening 64. The cooling fluid can subsequently be provided to the rotor assembly 53 aft of vane assembly 54 for cooling various components of rotor assembly 53.

Figure 3:
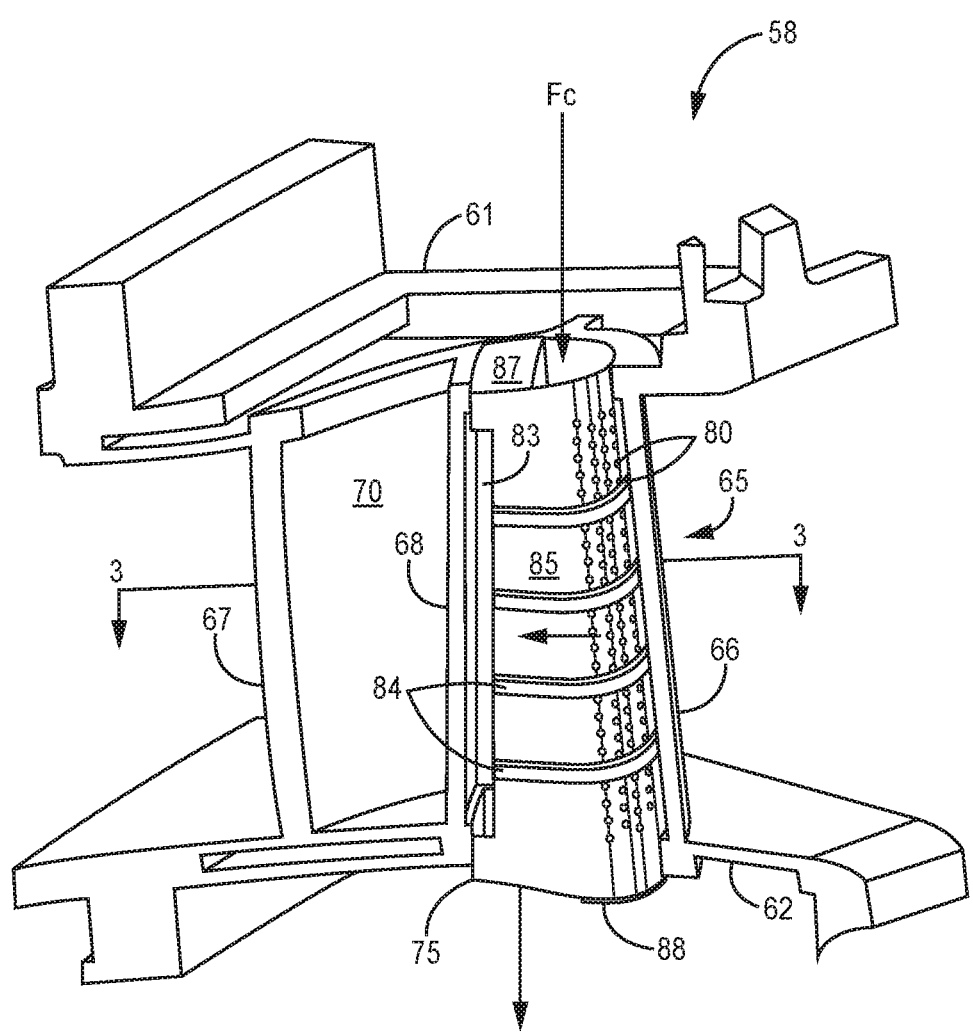
FIG. 3 is a cutaway perspective view of the vane of FIG. 2 with a variable heat transfer collector baffle.
Figure 4:
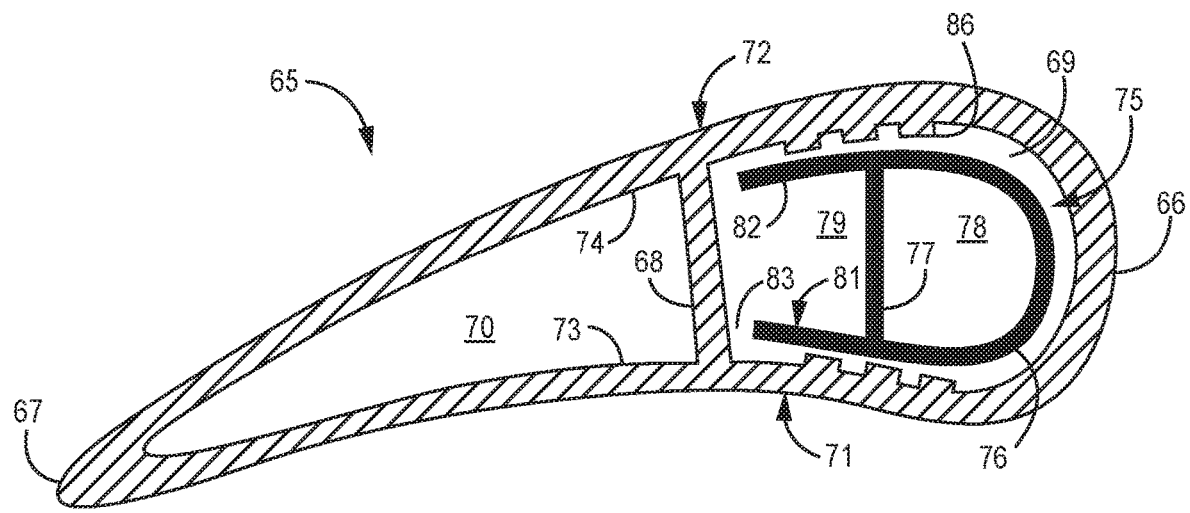
FIGS. 4 and 5 are cross-sectional views of the vane and collector baffle showing additional heat transfer features.

FIG. 3 is a perspective view of vane 58 with the pressure side wall removed to better illustrate the internal components. Vane 58 includes airfoil 65 extending between radially outer platform 61 and radially inner platform 62. FIG. 4 is a cross-section of airfoil 65 through a mid-span region. With reference to FIGS. 3 and 4, airfoil 65 includes a leading edge 66, trailing edge 67, and rib 68 positioned therebetween, forming leading edge cavity 69 and trailing edge cavity 70. Airfoil 65 also includes pressure sidewall 71 and suction sidewall 72 with inner surfaces 73 and 74, respectively, further defining leading edge cavity 69 and trailing edge cavity 70.

As shown in FIGS. 3 and 4, a baffle 75 is disposed within leading edge cavity 69. Baffle 75 can be formed from a metallic material, ceramic matrix composite (CMC) material, or other suitable material, and includes a wall 76 that generally corresponds with a shape of the airfoil cavity in which it is disposed. Because baffle 75 is shown disposed in leading edge cavity 69, wall 76 has a "U" shape. A divider 77 extends between opposing sides of wall 76 and separates forward chamber 78 from aft chamber 79. Baffle 75 also includes a number of impingement holes, or orifices 80 within a portion of wall 76 near leading edge 66 of airfoil 65. In the embodiment shown in FIG. 3, orifices 80 are relatively evenly sized and distributed along a forward portion of wall 76 in the axial and radial directions. The size of each individual orifice 80, as well as the total distribution of orifices 80 can be varied in alternative embodiments to vary thermal heat transfer properties of baffle 75. For example, a greater concentration of orifices 80 at a specific region of baffle 75 will allow greater flow through that region, thus providing greater thermal heat transfer at the corresponding location of airfoil 65.

Wall 76 includes oppositely disposed aft portions 81, 82 associated with aft chamber 79. Each aft wall portion 81, 82 includes one or more slots 83 that cause aft wall portions 81, 82 to stop short of contacting airfoil rib 68 at certain span wise locations. In the embodiment shown in FIG. 3, each wall portion 81, 82 includes a single, continuous slot 83.

Vane 58 can further include one or more axial ribs 84 within leading edge cavity 69 and positioned at various spanwise locations. In an exemplary embodiment, ribs 84 are formed on inner surface 73 and/or inner surface 74 of pressure side 71 and suction side 72, respectively. Ribs 84 contact wall 76 of baffle 75 to form a sealed flow cavity 85 within leading edge cavity 69 between each adjacent pair of ribs 84. Ribs 84 are located on one or both of the inner surfaces of airfoil 65 in embodiments in which airfoil 65 is formed from a metallic material (e.g., alloys of nickel, titanium, etc.). In such embodiments, ribs 84 can be incorporated in the casting mold used to form airfoil 65, or additively manufactured with airfoil 65. In alternative embodiments, however, such as those in which airfoil 65 is a CMC material like silicon-carbide, ribs 84 can instead be formed on wall 76 of baffle 75. In the embodiment shown in FIG. 3, ribs 84 extend continuously along wall 76 from slot to slot, but one or more ribs 84 can alternatively be segmented in the axial direction. For example, one embodiment can include ribs 84 extending from slot 83 on each side of baffle 75, but stopping short of the portion of wall 76 aligned with leading edge 66 of airfoil 65.

Figure 5:
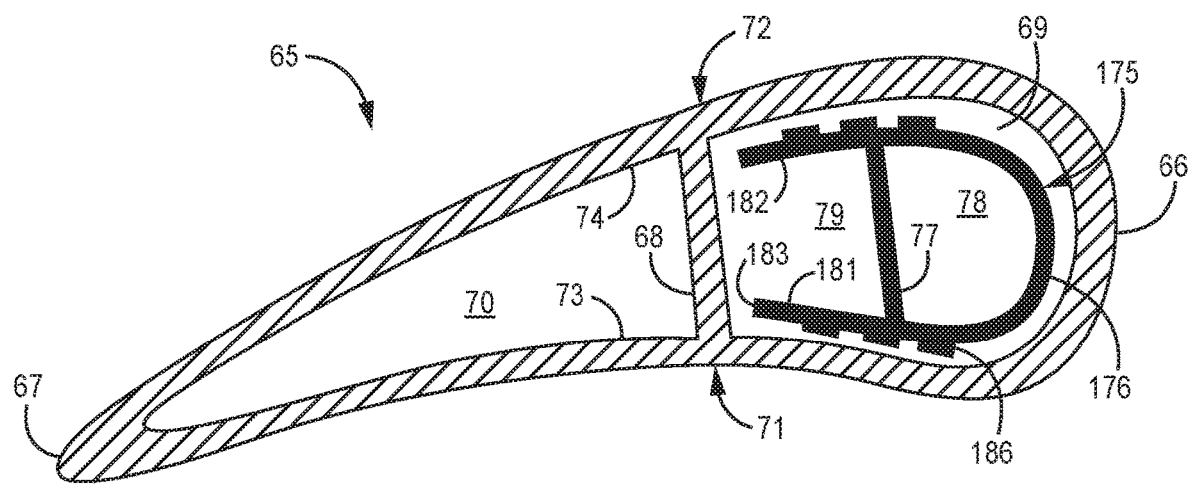

Vane 58 can further include thermal heat transfer features 86 within one or more of the sealed flow cavities 85. FIG. 4 shows thermal heat transfer features 86 formed on inner surfaces 73, 74 of airfoil 65. Similar to the formation of ribs 84, the embodiment of FIG. 4 can be used when airfoil 65 is formed from a metallic material. FIG. 5 shows an alternative embodiment of airfoil 65 having baffle 175 with thermal heat transfer features 186 formed on wall 176. In the embodiment of FIG. 5, airfoil 65 can be a CMC airfoil, and thermal heat transfer features 186 can be formed on baffle 175 using a process such as coining, welding, or additive manufacturing.

The addition of thermal heat transfer features 86, 186 can increase thermal heat transfer through pressure and suction sidewalls 71, 72. Such an embodiment may be advantageous in relatively high temperature applications (e.g., early turbine vane stages) where additional cooling is required. However, increasing the thermal heat transfer also increases thermal gradients and cooling air temperature. Therefore, thermal gradients and cooling air temperature can be minimized by limiting the placement of thermal heat transfer features to only those localized regions that require additional cooling and tailoring the size or type of thermal heat transfer feature to achieve the desired temperature and thermal gradient. Exemplary thermal heat transfer features 86, 186 can include trip strips, pin fins, or a combination of the two. Vane 58 can include one or a combination of thermal heat transfer features 186 in each sealed flow cavity 85, in only some of the sealed flow cavities 85, or in none.

In operation, and with continued reference to FIGS. 2-5, cooling fluid $F_C$ (indicated with arrows) is radially introduced to vane 58 at an inlet (shown in FIGS. 2 and 3 as radially outer platform 61). The cooling fluid is specifically supplied to forward chamber 78 of baffle 75, and an aft cover plate 87 is disposed over aft chamber 79 at outer platform 61 to prevent the cooling fluid from also entering aft chamber 79. The cooling fluid passes through the various orifices 80 within wall 76. A forward cover plate 88 is disposed over forward chamber 78 at inner platform 62 such that the cooling fluid must exit forward chamber 78 through one of the orifices 80. Cooling fluid that has passed through orifices 80 is directed to either pressure sidewall 71 or suction sidewall 72 of airfoil 65, and flows generally axially aft through one of the sealed cavities 85 due to the placement of ribs 84. Sealed flow cavities 85 prevent cooling fluid from radially redistributing. The cooling fluid then reaches slot 83 (on either side of baffle 75), and is drawn into aft chamber 79. The cooling fluid then flows radially to the open/outlet end of chamber 79 (shown in FIGS. 2 and 3 as radially inner platform 62). The combination and particular arrangement of forward chamber 78, orifices 80, sealed flow cavities 85, thermal heat transfer features 86, and aft chamber 79 allows the internal thermal heat transfer distribution to be tailored in order to mimic the external thermal heat transfer distribution, thereby minimizing thermal gradients and cooling fluid temperature while meeting desired airfoil wall temperature. This relatively cool fluid provided by this cooling scheme can subsequently be used to cool other turbine components.

Figure 6:
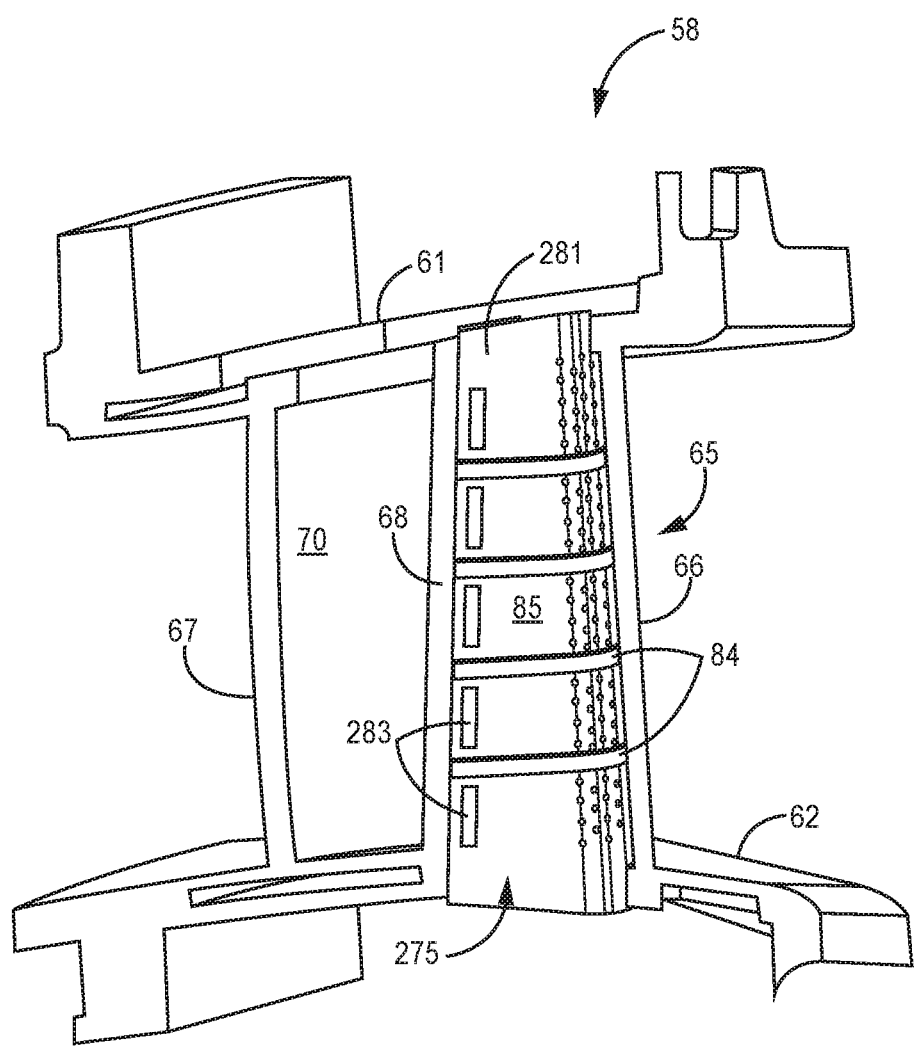
FIG. 6 is a cutaway perspective view of an alternative embodiment of the vane where the baffle takes an alternative shape.

FIG. 6 is a perspective view of vane 58 showing alternative baffle 275. Baffle 275 is similar to baffle 75, except that baffle 275 is fully in contact with rib 68 of airfoil 65 along aft wall portions 281, 282. Further, baffle 275 includes a number of individual slots 283 along each of wall portions 281 and 282, with each slot being associated with a sealed flow cavity 85. Such an embodiment can be used to provide greater baffle stiffness and greater support for baffle 275 within leading edge cavity 69.

While the disclosed cooling scheme has been described with respect to a turbine vane, it should be understood that that it can be used for other types of vanes, as well as rotor blades. While the trailing edge cavity is shown in the figures as being hollow, alternative embodiments of the vane can include a trailing edge cavity with its own cooling circuit (e.g., serpentine channels, a baffle, etc.). The disclosed vane can further include other features, such as a mid-chord cavity and/or film holes. Finally, the flow of cooling fluid can be altered in some embodiments such that cooling fluid is introduced to the forward chamber at a radially inner end of the component, and exits the aft chamber at the radially outer end of the component. In such an embodiment, the aft chamber would be covered at the radially inner end, and the forward chamber would be covered at the radially outer end.

The disclosed cooling scheme is highly customizable for use in various high temperature components, such as those used in aerospace and industrial applications. The disclosed cooling scheme allows for control of thermal gradients across components, especially CMC components, and reduces the need for dedicated cooling air.

Discussion of Possible Embodiments

The following are non-exclusive descriptions of possible embodiments of the present invention.

A gas turbine engine component includes an airfoil defined by a leading edge, a trailing edge, a pressure sidewall, and a suction sidewall. An internal cavity extends radially through the airfoil and is partially defined by an inner surface of the pressure sidewall and an inner surface of the suction sidewall. A baffle is disposed within the internal cavity, and includes a baffle wall conformal with adjacent surfaces of the internal cavity, a divider separating a forward chamber and an aft chamber, and a plurality of orifices extending through the baffle wall at the forward chamber. At least one axial rib is disposed between the baffle wall and the internal cavity, and is positioned at a discrete spanwise location of the airfoil.

The component of the preceding paragraph can optionally include, additionally and/or alternatively, any one or more of the following features, configurations and/or additional components:

In the above component, the aft chamber can further be defined by first and second aft portions of the baffle wall.

In any of the above components, the first and second aft wall portions can each include a slot.

In any of the above components, the at least one axial rib can include a first axial rib at a first spanwise location and a second axial rib at a second spanwise location.

In any of the above components, the first and second axial ribs can define a sealed flow cavity.

In any of the above components, the thermal heat transfer feature can be selected from the group consisting of trip strips, pin fins, and combinations thereof.

In any of the above components, the thermal heat transfer feature can be formed on the baffle wall.

In any of the above components, the thermal heat transfer feature can be formed on the inner surface of the pressure sidewall or the inner surface of the suction sidewall.

Any of the above components can further include a cover plate located at a radially outer end of the component and disposed to cover the aft chamber.

Any of the above components can further include a cover plate located at a radially inner end of the component and disposed to cover the forward chamber.

In any of the above components, the airfoil can be formed from a metallic material.

In any of the above components, the airfoil can be formed from a ceramic matrix composite material.

In any of the above components, the component can be a turbine vane.

In any of the above components, the baffle can be formed from a metallic material or ceramic matrix composite material.

A method of cooling a gas turbine engine component includes radially feeding, at a cooling inlet, a cooling fluid to a forward chamber of a baffle disposed within an internal cavity of the component, and axially passing a portion of the cooling fluid through an orifice within a baffle wall at the forward chamber. The method further includes axially passing the portion of the cooling fluid between the baffle wall and the internal cavity, and providing the portion of the cooling fluid to an aft chamber of the baffle.

The method of the preceding paragraph can optionally include, additionally and/or alternatively, any one or more of the following features, configurations and/or additional components:

The above method can further include radially passing the portion of the cooling fluid through the aft chamber.

In any of the above methods, passing the portion of the cooling fluid axially between the baffle and the internal cavity can include passing the portion of the cooling fluid between a first axial rib and a second axial rib.

Any of the above methods can further include blocking the forward chamber at an end opposite the cooling inlet.

Any of the above methods can further include blocking the aft chamber at an end adjacent the cooling inlet.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine component comprising:
an airfoil defined by a leading edge, a trailing edge, a pressure sidewall, and a suction sidewall;
an internal cavity extending radially through the airfoil and partially defined by an inner surface of the pressure sidewall and an inner surface of the suction sidewall;
a baffle disposed within the internal cavity, the baffle comprising:
a baffle wall conformal with adjacent surfaces of the internal cavity;
a divider separating a forward chamber and an aft chamber; and
a plurality of orifices extending through the baffle wall at the forward chamber; and
at least one axial rib disposed between the baffle wall and the internal cavity and positioned at a discrete spanwise location of the airfoil;
wherein the aft chamber is defined by first and second aft portions of the baffle wall; and
wherein the first and second aft portions of the baffle wall each comprise a slot.

2. The component of claim 1, wherein the at least one axial rib comprises a first axial rib at a first spanwise location and a second axial rib at a second spanwise location.

3. The component of claim 2, wherein the first and second axial ribs define a sealed flow cavity.

4. The component of claim 3 and further comprising: a thermal heat transfer feature within the sealed flow cavity.

5. The component of claim 4, wherein the thermal heat transfer feature is selected from the group consisting of trip strips, pin fins, and combinations thereof.

6. The component of claim 4, wherein the thermal heat transfer feature is formed on the baffle wall.

7. The component of claim 4, wherein the thermal heat transfer feature is formed on the inner surface of the pressure sidewall or the inner surface of the suction sidewall.

8. The component of claim 1 and further comprising: a cover plate located at a radially outer end of the component and disposed to cover the aft chamber.

9. The component of claim 1 and further comprising: a cover plate located at a radially inner end of the component and disposed to cover the forward chamber.

10. The component of claim 1, wherein the airfoil is formed from a metallic material.

11. The component of claim 1, wherein the airfoil is formed from a ceramic matrix composite material.

12. The component of claim 1, wherein the component is a turbine vane.

13. The component of claim 1, wherein the baffle is formed from a metallic material or a ceramic matrix composite material.

14. A method of cooling a gas turbine engine component, the method comprising:
radially feeding, at a cooling inlet, a cooling fluid to a forward chamber of a baffle disposed within an internal cavity of the component;
axially passing a portion of the cooling fluid through an orifice within a baffle wall at the forward chamber;
axially passing the portion of the cooling fluid between the baffle wall and the internal cavity; and
providing the portion of the cooling fluid to an aft chamber of the baffle, the aft chamber being defined by first and second aft portions of the baffle wall;
wherein the providing step comprises passing the portion of the cooling fluid through a slot in the first or second aft portion of the baffle wall.

15. The method of claim 14 and further comprising: radially passing the portion of the cooling fluid through the aft chamber.

16. The method of claim 14, wherein passing the portion of the cooling fluid axially between the baffle and the internal cavity comprises passing the portion of the cooling fluid between a first axial rib and a second axial rib.

17. The method of claim 14 and further comprising: blocking the forward chamber at an end opposite the cooling inlet.

18. The method of claim 17 and further comprising: blocking the aft chamber at an end adjacent the cooling inlet.

19. A gas turbine engine component comprising:
an airfoil defined by a leading edge, a trailing edge, a pressure sidewall, and a suction sidewall;
an internal cavity extending radially through the airfoil and partially defined by an inner surface of the pressure sidewall and an inner surface of the suction sidewall;
a baffle disposed within the internal cavity, the baffle comprising:

a baffle wall conformal with adjacent surfaces of the internal cavity;
a divider separating a forward chamber and an aft chamber; and
a plurality of orifices extending through the baffle wall at the forward chamber; and
at least one axial rib disposed between the baffle wall and the internal cavity and positioned at a discrete spanwise location of the airfoil; and
a cover plate located at a radially inner end of the component and disposed to cover the forward chamber.

* * * * *